(12) United States Patent
Vannier et al.

(10) Patent No.: US 8,179,080 B2
(45) Date of Patent: May 15, 2012

(54) RECIPROCATING ACTUATOR WITH CLOSED LOOP SERVOCONTROL

(75) Inventors: Jean-Claude Vannier, Malakoff (FR); Amir Arzande, Les Ulis (FR); Gerard Jeanblanc, Sevres (FR); Isabelle Gibek, L'Union (FR); Denis Schwander, Labarthe sur Leze (FR)

(73) Assignee: Centre National d'Etudes Spatiales (C.N.E.S.), Paris (FR)

( * ) Notice: Subject to any disclaimer, the term of this patent is extended or adjusted under 35 U.S.C. 154(b) by 360 days.

(21) Appl. No.: 12/599,664

(22) PCT Filed: May 7, 2008

(86) PCT No.: PCT/FR2008/000641
§ 371 (c)(1),
(2), (4) Date: Nov. 10, 2009

(87) PCT Pub. No.: WO2008/152236
PCT Pub. Date: Dec. 18, 2008

(65) Prior Publication Data
US 2010/0301796 A1 Dec. 2, 2010

(30) Foreign Application Priority Data
May 11, 2007 (FR) ...................................... 07 03380

(51) Int. Cl.
*H02P 25/06* (2006.01)
(52) U.S. Cl. ......................... 318/686; 318/626; 318/687
(58) Field of Classification Search .................. 318/599, 318/626, 652, 686, 687
See application file for complete search history.

(56) References Cited

U.S. PATENT DOCUMENTS

| 3,848,411 | A |   | 11/1974 | Strawn |   |
|---|---|---|---|---|---|
| 5,161,083 | A |   | 11/1992 | Mohler et al. |   |
| 6,015,272 | A | * | 1/2000 | Antaki et al. | ................. 417/356 |
| 6,043,616 | A |   | 3/2000 | Redelberger |   |
| 6,447,265 | B1 | * | 9/2002 | Antaki et al. | ................. 417/354 |

FOREIGN PATENT DOCUMENTS

| EP | 1250526 | 10/2002 |
|---|---|---|
| JP | 08201402 | 8/1996 |
| JP | 09282005 | 10/1997 |
| JP | 09282006 | 10/1997 |
| WO | 0146581 | 6/2001 |

OTHER PUBLICATIONS

International Search Report dated Aug. 21, 2009, in PCT application.

* cited by examiner

*Primary Examiner* — Bentsu Ro
(74) *Attorney, Agent, or Firm* — Young & Thompson

(57) ABSTRACT

A reciprocating actuator includes at least one element moving reciprocally relative to a rack, a device for driving the moving element in a driving direction, an element for returning the moving element in an opposite direction, at least one sensor for detecting the position of the moving element, and a servocontrol adapted to deliver, for each displacement cycle of the moving element in the driving direction, at least one correction signal (S5) representative of the difference between the energy imparted on the moving element during at least one preceding cycle, and the nominal energy to be imparted on this moving element to displace it exactly to its extreme set-point position, and to adjust on each cycle the control signal of the driving device according to the correction signal (S5).

20 Claims, 4 Drawing Sheets

RECIPROCATING ACTUATOR WITH CLOSED LOOP SERVOCONTROL

Figure 1:
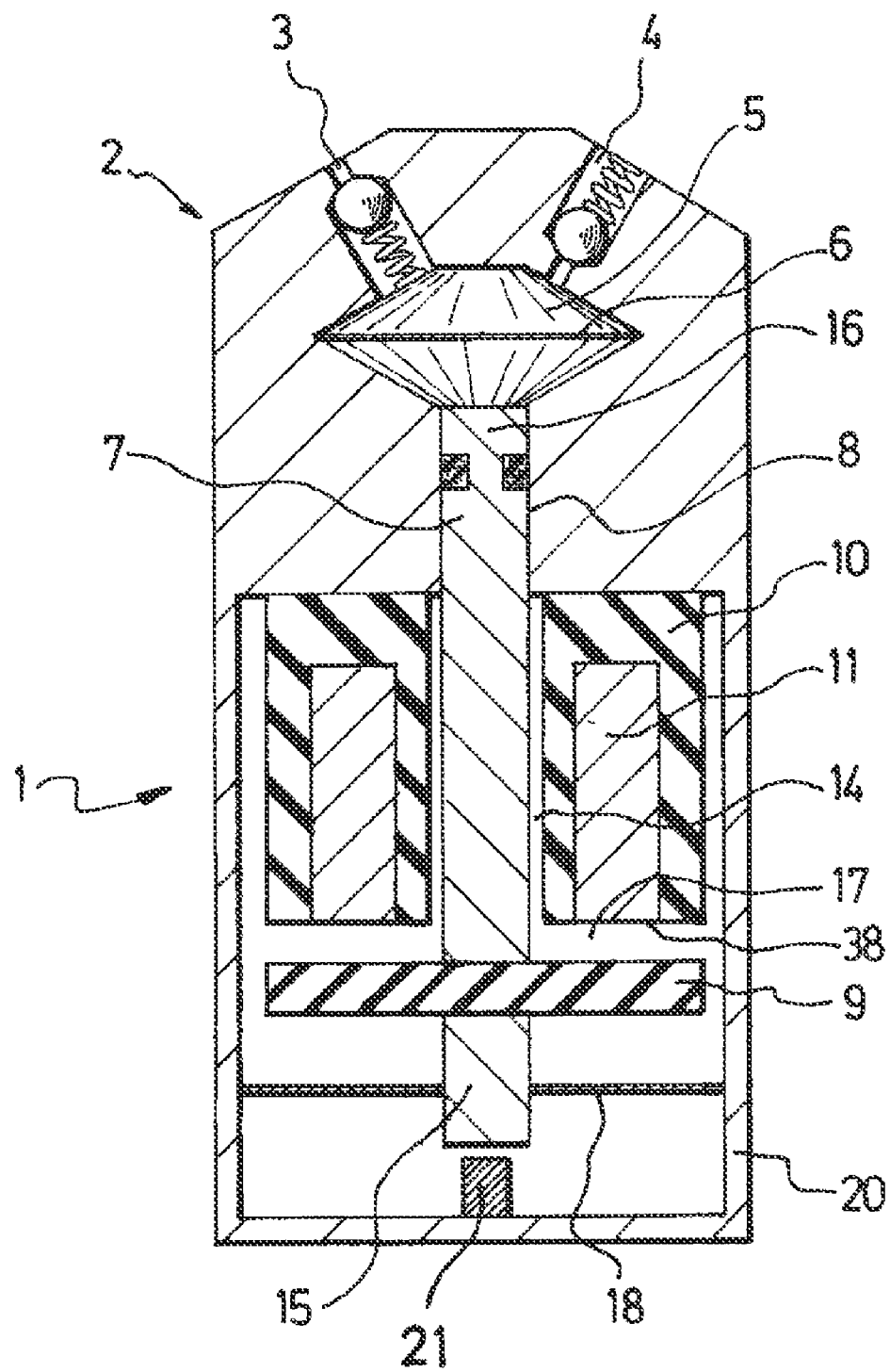

The invention relates to a reciprocating actuator comprising a rack, at least one moving element guided relative to the rack so as to be able to be displaced with reciprocating motion relative to said rack, a device for driving the moving element in one direction, known as the driving direction, means of returning the moving element in a direction opposing the driving direction, at least one sensor for detecting the position of the moving element relative to the rack, capable of delivering a position signal representative of at least the position of said moving element in the vicinity of its extreme end of displacement position in the driving direction, and a servocontrol adapted to deliver a control signal of the driving device, the value thereof being determined for each displacement cycle of the moving element in the driving direction, according to the difference between an extreme position adopted previously by the moving element in the driving direction as determined by the position signal and a predetermined extreme limit position of the moving element in its displacement in the driving direction, said control signal being designed to be able to interrupt the driving device before the moving element arrives in the end of travel position in the driving direction.

EP-A-1250526 discloses an electric pump comprising such a reciprocating actuator of the variable reluctance type. Said actuator provides an entirely satisfactory solution. Various solutions have been considered to implement the closed loop servocontrol of said actuator. However, all the solutions considered have a certain number of drawbacks. In particular, none of the proposed solutions is simultaneously simple, rapid, reliable, accurate and compatible for use in any type of environment, including in a space environment.

Thus, a servocontrol based on the use of a microcomputer carrying out an instantaneous adjustment in real time of the driving force imparted to the moving element, according to its detected position, may afford a high degree of reliability and accuracy but is not compatible for use in a space environment, to the extent that the digital circuits forming said microcomputers are particularly sensitive to space radiation.

Moreover, a position control carried out by similar components compatible with a space environment would not achieve sufficient rapidity, accuracy and reliability to obtain effective, accurate control of the operation of the actuator, specific vibrations or irregularities in the displacement amplitude being able to be generated in an untimely manner in certain operating ranges, in particular at high frequency (in particular greater than 10 Hz) and/or for small displacements. Moreover, by means of such a position control it would not be possible to avoid exceeding the set-point position in an untimely manner (able to cause violent impacts in the case of an electromagnetic actuator with variable reluctance) in certain specific conditions, in particular when starting up or in the event of locking.

It is noteworthy in this respect that these problems are posed with even more severity in the case of an electromagnetic actuator with variable reluctance for which the driving force is proportional, in a first approximation, to the inverse square of the air gap. As a result, if the driving force is not stopped sufficiently early during the cycle, the moving armature of the actuator, subjected to a force of very high value, violently strikes the fixed armature.

The invention aims to remedy these drawbacks by proposing a servocontrol for a reciprocating actuator, in particular of the electromagnetic type with variable reluctance, which is simultaneously sufficiently rapid, reliable and accurate, having a wide operating range, including at relatively high frequency, in particular being able to be greater than 100 Hz, and for low displacement amplitudes, being able to be typically in the order of a few tenths of a millimeter to a few millimeters and, moreover, able to be produced with similar components of high reliability, in particular compatible with the use of the actuator in a space environment.

To achieve this object, the invention relates to a reciprocating actuator comprising:
  a rack,
  at least one moving element guided relative to the rack so as to be able to be displaced with reciprocating motion relative to said rack,
  a device for driving the moving element in at least one direction, known as the driving direction,
  means of returning the moving element in a direction opposing the driving direction,
  at least one sensor for detecting the position of the moving element relative to the rack, capable of delivering a position signal representative of at least the position of said moving element in the vicinity of its extreme end of displacement position in the driving direction,
  a servocontrol adapted to adjust and deliver, for each displacement cycle of the moving element in the driving direction, a control signal of the driving device, the value thereof being determined for each cycle according to the difference between an extreme position adopted previously by the moving element in the driving direction as determined by the position signal and a predetermined extreme limit position of the moving element in its displacement in the driving direction,
wherein the servocontrol:
  comprises at least one measuring chain designed to deliver, for each displacement cycle of the moving element in the driving direction, at least one signal, known as the correction signal, representative of the difference between the energy imparted on the moving element by the driving device during at least one cycle preceding that in which the control signal is applied, and the energy, known as nominal energy, to be imparted on this moving element to displace it exactly to its extreme set-point position.
  is designed to adjust for each cycle the control signal according to said correction signal,
  and is designed to deliver a control signal, said control signal interrupting the driving device before the moving element arrives in the end of travel position in the driving direction.

The correction signal is representative of the insufficient energy or surplus energy imparted on the moving element during at least one preceding cycle, and this difference in energy makes it possible to calibrate the driving of this moving element during a subsequent cycle. Each cycle includes at least one displacement of the moving element in the driving direction, followed by a displacement of the moving element in the direction opposing the driving direction, each inversion of the direction of displacement being carried out for each cycle at least beyond position references which are identical for all cycles, but distant from one another depending on the relevant displacement direction. A plurality of variants are possible, in particular depending on the desired dynamics for the servocontrol. Thus, the correction signal may take into account such a difference in energy over a plurality of successive cycles, for example by creating an average of this energy difference over a plurality of cycles, to calibrate the control signal of a subsequent cycle.

However, advantageously, in an actuator according to the invention, the correction signal is representative of at least the difference between the energy imparted on the moving element by the driving device during the displacement cycle immediately preceding that in which the control signal is applied, and the nominal energy. Preferably, the correction signal is solely representative of the difference between the energy imparted on the moving element by the driving device during the displacement cycle immediately preceding that in which the control signal is applied, and the nominal energy.

A plurality of embodiments may be considered to evaluate such an energy difference and to produce the correction signal. However, advantageously and according to the invention, the correction signal is representative of a difference between a first value which is proportional to a time period during which the moving element exceeds, in the driving direction, a first position reference without exceeding a second position reference located downstream of the first position reference in the driving direction, and a second value which is proportional to a time period during which the moving element exceeds, in the driving direction, said second position reference. The inventors have observed that, aside from multiplier coefficients, simply measuring the difference between the time periods when the moving element exceeds the two position references makes it possible, in practice, to represent in an extremely simple manner the value of the product between the difference in the position of the moving element relative to its set-point position using the restoring force which, in a first approximation, may be considered as constant over the measuring time interval. Such an embodiment is particularly simple, may be formed essentially, even exclusively, of similar components, but is nevertheless very accurate, including at relatively high frequency ranges, in particular from 0 to 300 Hz. The multiplier coefficients applied to each of the time periods are constants which are preferably predetermined in the factory during manufacture according to the dynamic characteristics of the actuator, in particular of the driving device and the return means. As a variant or in combination, an actuator according to the invention advantageously comprises means for adjusting said multiplier coefficients, permitting the user to modify the response sensitivity of the servocontrol.

Similarly, the first position reference and/or the second position reference and/or the extreme limit position may be predetermined during manufacture at the factory. As a variant or in combination, advantageously and according to the invention, the servocontrol comprises adjusting means making it possible to adjust the value of the first position reference and/or of the second position reference.

According to the dynamics of the servocontrol, the position references may be selected to be more or less close to one another, and more or less close to the extreme set-point position. However, preferably, advantageously and according to the invention, the second position reference corresponds to the extreme limit position.

The invention relates not only to an actuator of which at least one moving element is displaced reciprocally without sustaining an impact, but also to other applications in which at least one moving element may strike a fixed part of the rack, so as to form a striker. Thus, advantageously, in an actuator according to the invention, said adjusting means make it possible to adjust the second position reference beyond the possible displacement amplitude of the moving element in the driving direction, such that said moving element abuts against a bearing surface of the rack. In this variant, the extreme limit position is located beyond said fixed supporting surface of the rack and thus, in practice, is never reached in reality.

Moreover, advantageously, in an actuator according to the invention, the servocontrol is such that for each cycle it only authorizes the application of the control signal of the driving device when the moving armature is at a greater distance from the fixed armature than a predetermined position, known as the principal position reference, of the moving armature. Moreover, advantageously, in an actuator according to the invention, for each cycle the servocontrol limits the total duration of the application of the control signal to a duration which is less than the time period during which the moving armature is located beyond said principal position reference. Moreover, advantageously, in an actuator according to the invention, said adjusting means make it possible to adjust said principal position reference such that it corresponds to the extreme maximum air gap position.

Moreover, advantageously and according to the invention, as the driving device is of the type providing increasing driving energy with the duration of the application of an electrical control signal, the servocontrol is designed to adjust the control signal, from the correction signal, by pulse width modulation of this control signal. Thus, in this particularly simple and advantageous variant of the invention, the correction signal is used by the servocontrol to adjust the duty cycle of the pulse width modulation of the control signal.

As a variant or in combination, advantageously and according to the invention, the servocontrol comprises means making it possible to adjust the total duration of the application of the control signal independently of the correction signal—in particular to carry out an initial adjustment of the actuator, the value of this total duration remaining constant during operation.

In an actuator according to the invention, the driving device is associated with the moving element so as to be able to drive said moving element in the driving direction, but without being able to limit or slow down the displacements of the moving element, nor fix its position. Thus, the driving device is of the unidirectional and pulse type (i.e. solely capable of providing an amount of motion to the moving element) and the moving element is guided relative to the rack independently of the driving device, such that the moving element continues on its course when the driving device is stopped.

The driving device of an actuator according to the invention may be of different types. In the case where the driving device is of the electromagnetic type, the adjustment of the total duration of the application of the control signal makes it possible to obtain an initial approximate adjustment of the driving energy provided to the moving element in each cycle (said adjustment being implemented by initial configuration by the user) whilst the servocontrol adjusts in each cycle, from the correction signal, the control signal by pulse width modulation, thus producing an accurate adjustment of this energy imparted to the moving element. This embodiment is particularly advantageous in the case where the driving device is of the electromagnetic type with variable reluctance, said moving element comprising a moving armature of this device.

Thus, advantageously, an actuator according to the invention is an electromagnetic linear actuator with variable reluctance comprising a moving armature guided in reciprocating translation motion relative to an armature which is fixed integrally to the rack.

The invention, however, also applies to any other type of actuator comprising at least one moving element guided in reciprocating translation motion relative to the rack and/or at least one moving element guided in reciprocating rotational motion relative to the rack. A moving element is a moving part or an assembly of moving parts which are fixed in their reciprocating displacements relative to the rack. An actuator according to the invention may comprise a single moving element or, in contrast, a plurality of moving elements controlled by the same servocontrol or by a plurality of similar servocontrols.

Moreover, in an actuator according to the invention, said means for returning the moving element in a direction opposing the driving direction may be of different types. For example, said return means may be formed by a further device for driving in the opposing direction, or even by the same driving device if said driving device is bidirectional. Said return means may also result from the operation of the actuator itself in the system in which it is incorporated. For example, if the actuator is used to drive a pump, the operation of the pump may have the result of tending to return the moving element in a direction opposing the driving direction.

As a variant or in combination, advantageously and according to the invention, said return means comprise resilient mechanical return means returning the moving element into a resting position remote from its extreme end of displacement position in the driving direction. Said resilient mechanical return means are, for example, formed by a resilient flexible blade and/or a compression spring and/or a traction spring interposed between the moving element and the rack.

Advantageously, an actuator according to the invention is designed so that the moving element has a displacement path of between 0.1 mm and 10 mm, and may be driven at a frequency of between 0 and 1000 Hertz.

Advantageously in an actuator according to the invention, the servocontrol may be implemented by an electronic circuit formed essentially—or even exclusively—of similar components. Such components prove particularly advantageous within the context of space applications to the extent that they are particularly reliable, have a long service life and are tolerant of radiation such as those encountered in space, for example on-board artificial terrestrial satellites.

The invention also relates to an actuator characterized in combination by all or some of the features mentioned above or below. It also relates to a method for servocontrol implemented in an actuator according to the invention.

Figure 2:
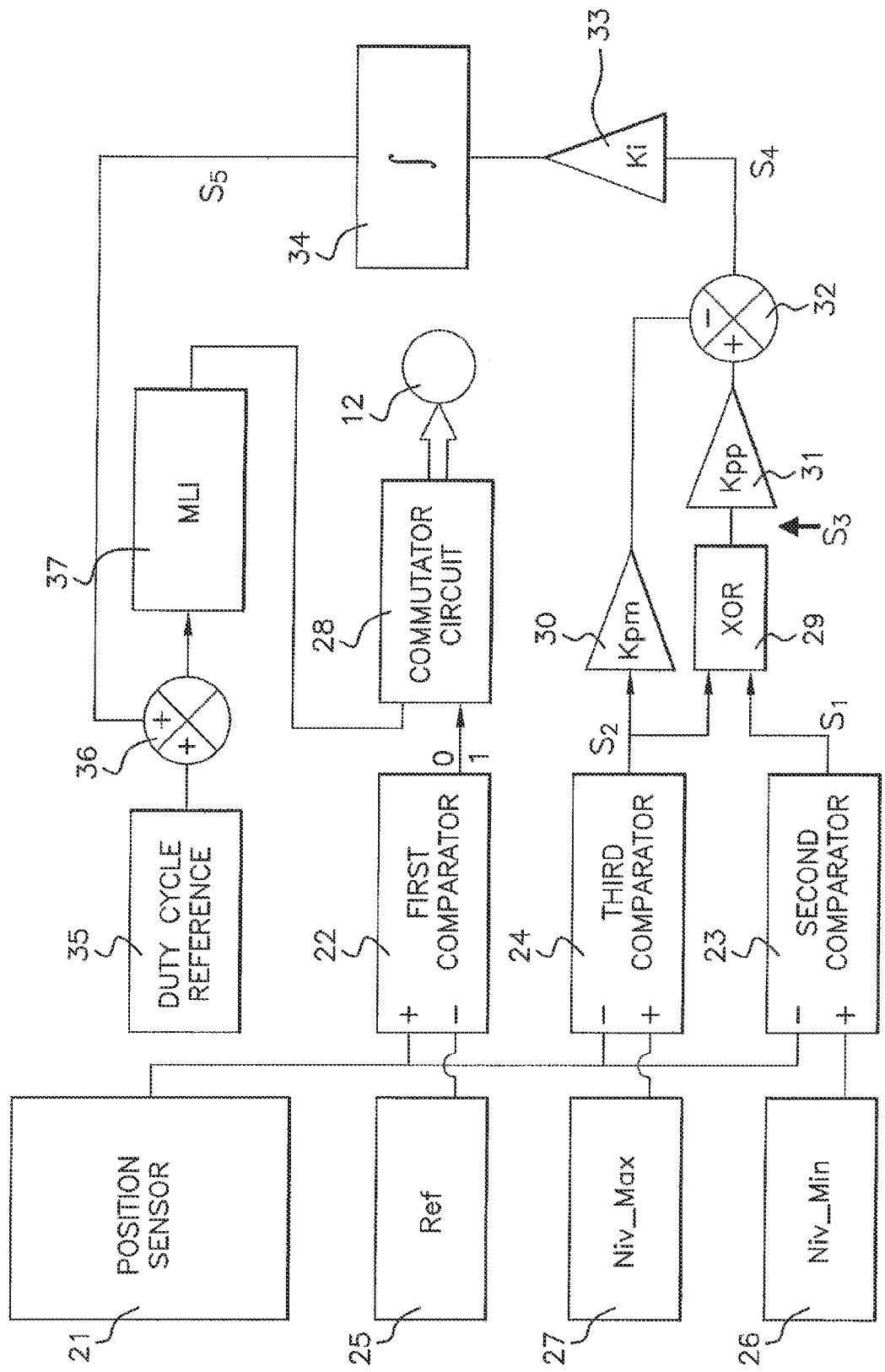
Figure 3:
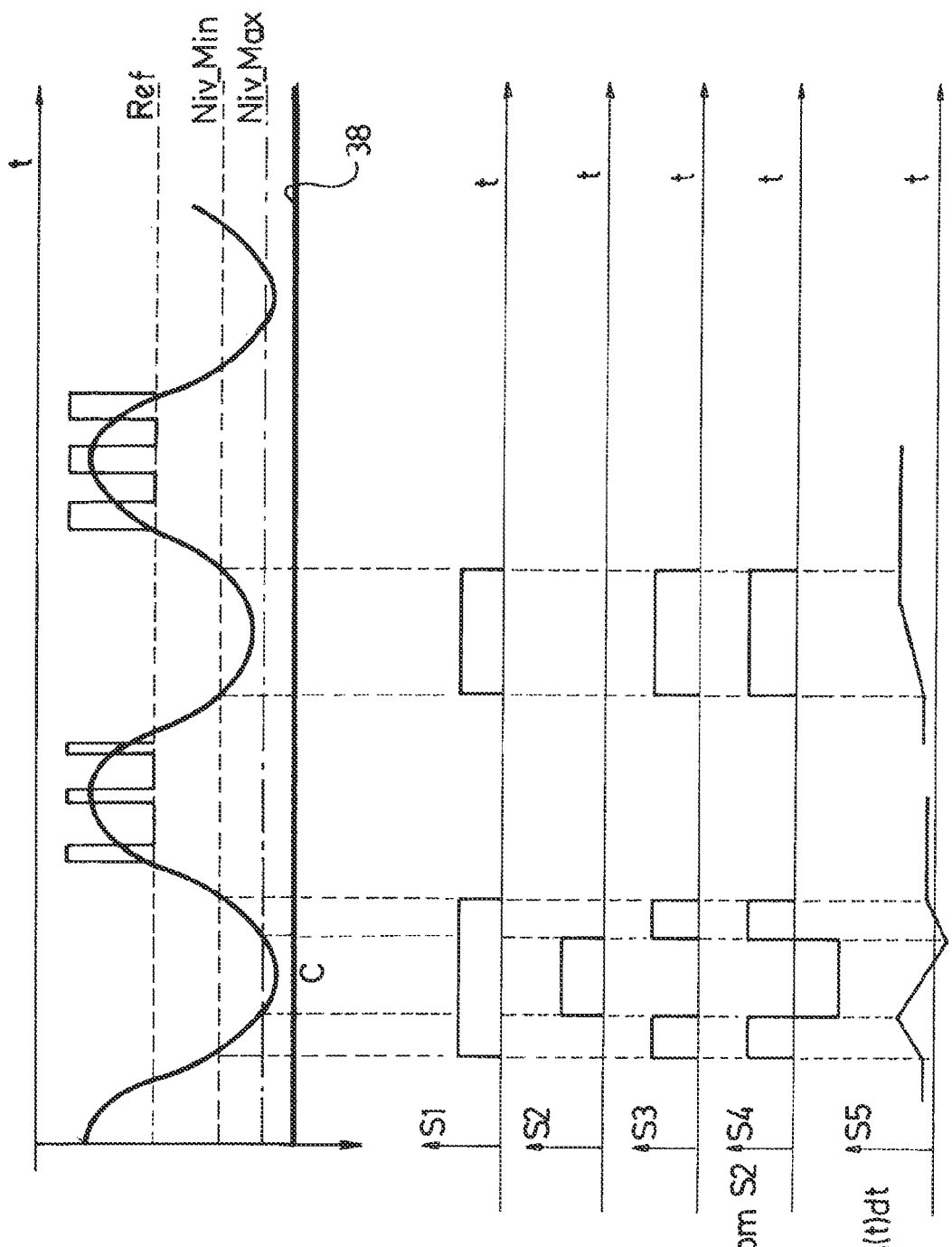
Figure 4:
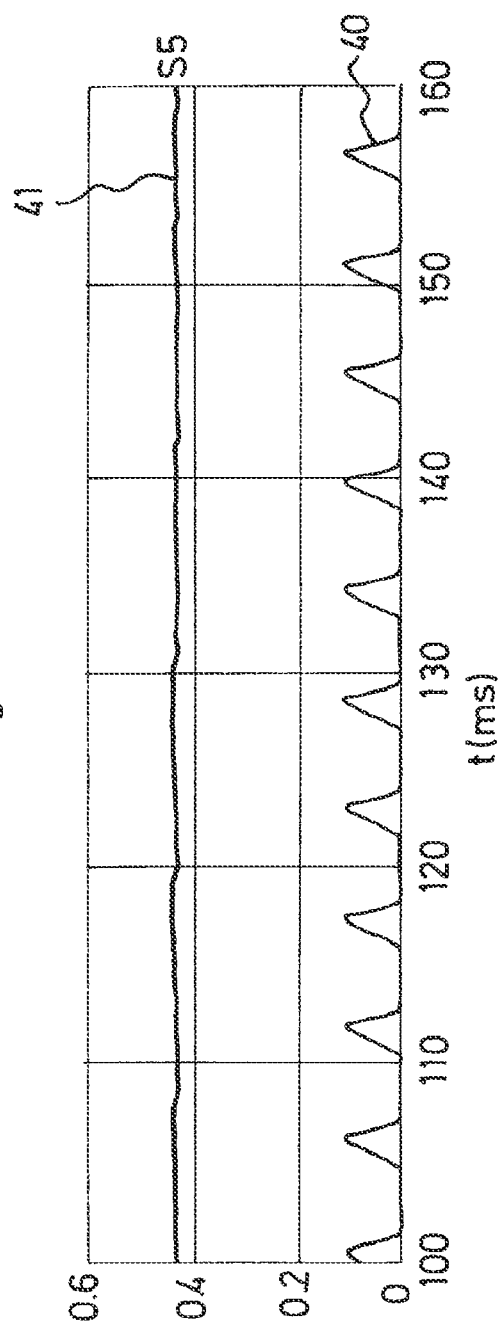
Figure 4:
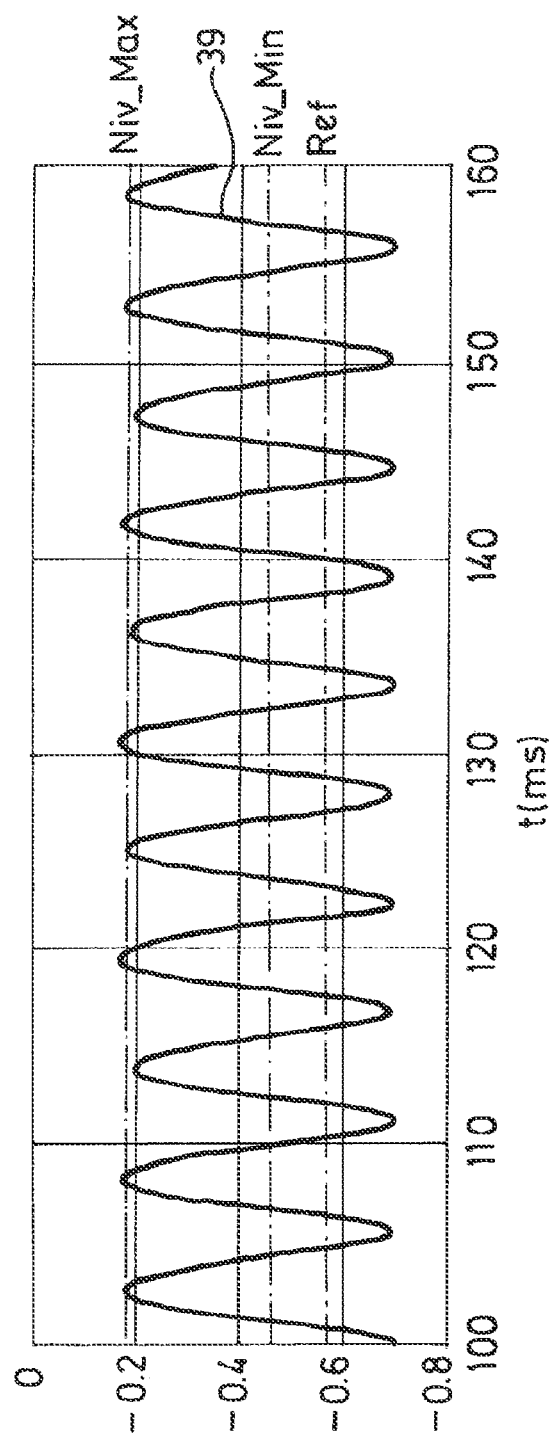

Further objects, features and advantages of the invention will become apparent by reading the following description of one of its embodiments given solely by way of non-limiting example and which refers to the accompanying figures, in which:

FIG. 1 is a schematic view in axial section of an embodiment of an actuator according to the invention forming a pump, FIG. 2 is a block diagram of the implementation of a servocontrol for the actuator of FIG. 1, FIG. 3 is a theoretical time diagram representing, on the one hand, the displacement of the moving element of the actuator of FIG. 1 and, on the other hand, the value of the different signals in the electronic circuit implementing the servocontrol of FIG. 2, FIG. 4 is a similar time diagram to that of FIG. 3, but obtained by an analytical simulation of the operation of the actuator according to the invention.

In the example shown in FIG. 1, the actuator 1 is of the variable reluctance type, and associated with a pump 2 comprising a rigid rack 20 having an inlet orifice 3, a return orifice 4, and a pumping chamber 5 with a sealed central flexible membrane 6. Said membrane 6 is moved by the variations in pressure caused by the displacement of a piston 7 guided in reciprocating translation motion in a cylinder 8 formed in the rack 20 and opening into the chamber 5 opposite the orifices 3, 4, the cylinder 8 and the orifices 3, 4 being separated by the membrane 6.

The piston 7 is connected to a moving armature 9 made of ferromagnetic material extending radially in the general shape of a disc. The moving armature 9 is integral with the piston 7 in its reciprocating translation motion, and the assembly formed by the piston 7 and the moving armature 9 forms a moving element 7, 9. The moving armature 9 extends opposite a fixed armature 10 also made of ferromagnetic material, so as to form an air gap 17 between the moving armature 9 and the fixed armature 10. The fixed armature 10 houses a winding 11 supplied by a control circuit 12.

The moving armature 9 and fixed armature 10, in addition to the winding 11, are designed to form a driving device with variable reluctance, so that when an electric current is supplied to the winding 11, an electromagnetic force attracts the moving armature 9 to the fixed armature 10, in the sense of reducing the air gap 17 which separates them.

The winding 11 is housed in a cylindrical housing formed in the fixed armature 10 and the piston 7 passes through an axial bore 14 of the fixed armature 10, the moving armature 9 being coupled (for example by a system of nuts and lock nuts and/or by keying and/or by banding and/or by any other fixing means) to the end 15 of the piston 7 extending opposite, relative to the axial bore 14, the end 16 of the piston 7 oriented towards the pumping chamber 6.

The end 15 of the piston 7 coupled to the moving armature 9 is also associated with a spring 18 with resilient flexible radial blades of which the external end is flush-mounted in the rack 20. Said spring 18 is designed to return the piston 7 in the removal direction of the moving armature 9 relative to the fixed armature 10, opposing the driving direction, when the winding 11 is not supplied with current. It is also noteworthy that the pressure in the pumping chamber 6 also tends naturally to return the piston 7 in the removal direction when the winding 11 is not supplied with current. Thus, the piston 7 is driven in translation into the cylinder 8 in a driving direction corresponding to an increase in pressure in the pumping chamber 6, when the winding 11 is supplied with electric current, and is returned in translation into the cylinder 8 in a removal direction opposing the driving direction when the winding 11 is not supplied with electric current. As a result, depending on the frequency of the supply of electric current to the winding 11, the moving armature 9 and the piston 7 are driven in axial reciprocal translation relative to the rack 20.

A position sensor 21 is integrally fixed to the rack 20. Advantageously, said sensor 21 is of the inductive type, and makes it possible for a signal to be obtained in its winding which is representative of the position of the end 15 of the moving armature 9, and thus of the piston 7 relative to the fixed armature 10 and the rack 20.

FIG. 2 shows an example of the electronic circuit producing a closed loop servocontrol making it possible to control the operation of the actuator.

The position signal obtained from the position sensor 21 is provided to three respective comparators 22, 23, 24.

The first comparator 22 compares the position signal with a principal reference signal Ref delivered by a circuit 25 which provides a predetermined voltage value representative of this reference signal Ref. This value may be predetermined and stored during manufacture at the factory. Preferably, the circuit 25 is associated with means for adjusting this value, permitting the user to carry out an initial adjustment of this signal Ref, for example in the form of a circuit (not shown), making it possible to add to the voltage signal delivered by the circuit 25 a variable voltage correction signal able to be adjusted by the user.

The output of this first comparator 22 is connected to the input of a commutator circuit 28 which makes it possible for the control signal of the winding 11 delivered by the control circuit 12 to be authorized or prevented. The control signal is only authorized by this commutator circuit 28 if the moving armature 9 is at a greater distance from the fixed armature 10 than the position of the moving armature 9 defined by this principal reference signal Ref.

The second comparator 23 compares the position signal with a first minimum position signal Niv_Min delivered by a circuit 26 which provides a voltage value representative of this first position signal Niv_Min. This value may be predetermined and stored during manufacture in the factory. Preferably, the circuit 26 is associated with means for adjusting this value, permitting the user to carry out an initial adjustment of this first position signal Niv_Min, for example in the form of a circuit (not shown), making it possible to add to the voltage signal delivered by the circuit 26 a variable voltage correction signal, able to be adjusted by the user. This first minimum position signal Niv_Min corresponds to a first position reference of the moving armature 9 which at least has to be reached in the driving direction.

This second comparator 23 provides a logic signal S1, which as shown in FIG. 3, has a constant non-zero value when the moving armature 9 has exceeded the position defined by said first minimum position signal Niv_Min and is zero as long as the moving armature 9 does not reach the position defined by this first minimum position signal Niv_Min.

The third comparator 24 compares the position signal with a second maximum position signal Niv_Max delivered by a circuit 27 which provides a voltage value representative of this second position signal Niv_Max. This value may be predetermined and stored during manufacture in the factory. Preferably, the circuit 27 is associated with means for adjusting this value, permitting the user to carry out an initial adjustment of this second position signal Niv_Max, for example in the form of a circuit (not shown), making it possible to add to the voltage signal delivered by the circuit 27 a variable voltage correction signal able to be adjusted by the user. This second maximum position signal Niv_Max corresponds to a second position reference of the moving armature 9 which has to be reached in the driving direction. It may, for example, be the extreme limit position.

This third comparator 24 provides a logic signal S2 which, as shown in FIG. 3, has a constant non-zero value when the moving armature 9 has exceeded the position defined by said second maximum position signal Niv_Max, and is zero when the moving armature 9 does not reach the position defined by this second maximum position signal Niv_Max.

The outputs of the second comparator 23 and of the third comparator 24 are connected to the inputs of a gate (XOR 29 (exclusive OR) which delivers a logic signal S3 which is the exclusive OR function of the signals S1 and S2.

The output of the third comparator 24 delivering the logic signal S2 is also connected to the input of an amplifier 30 which delivers an amplified signal with a constant gain Kpm, i.e. of the value Kpm.S2. The output of the gate XOR 29 delivering the logic signal S3 is connected to the input of an amplifier 31 which delivers an amplified signal with a constant gain Kpp, i.e. of the value Kpp.S3. The two outputs and the amplifiers 30, 31 respectively delivering said two amplified signals are connected to the inputs of a subtractor circuit 32 which delivers a signal S4 of which the value is:

$$S4 = Kpp.S3 - Kpm.S2$$

The output of said circuit 32 with this factor delivering said signal S4 is connected to the input of an amplifier 33 which delivers an amplified signal with a constant gain Ki, i.e. of the value Ki.S4. The output of this amplifier 33 delivering this amplified signal is connected to the input of an integrator circuit 34 which delivers a signal S5 of which the value is:

$$S5 = \int Ki\, S4\,(t)dt$$

The signal S3 is representative of the time period during which the moving armature 9 exceeds, in the driving direction, the first position reference Niv_Min without exceeding the second position reference Niv_Max. The signal S2 is representative of the time period during which the moving armature 9 exceeds the second position reference Niv_Max.

The signal S5 is thus representative, aside from the multiplier coefficients Ki, Kpp and Kpm, of the difference between the time period during which the moving armature 9 is located between the first position reference Niv_Min and the second position reference Niv_Max and the time period during which the moving armature 9 exceeds, in the driving direction, the second position reference Niv_Max.

This signal S5 makes it possible, therefore, to evaluate the difference between the energy imparted on the moving element 7, 9 by the winding 11 during the preceding cycle and the energy, known as nominal energy, imparted on this moving element 7, 9 to displace it exactly to the extreme set-point position represented by the maximum position signal Niv_Max.

The signal S5 is used by the servocontrol in the manner of a correction signal to modify the control of the winding 11 by the control circuit 12. To this end, the control circuit 12 is associated with a generator MLI 37, which delivers to the control circuit 12 a signal modulating the pulse width of the control signal. Thus, this control circuit 12 delivers a voltage control signal of predetermined constant amplitude (selected in particular to optimize the operation of the driving device with variable reluctance thus formed) and consisting of a series of pulses of identical duration but dependent on the duty cycle of the generator MLI 37, such that the energy imparted to the moving armature 9, and thus to the moving element 7, 9, by the winding 11 is proportional to the duration of each of the pulses, i.e. to their width on a time diagram. The duty cycle determines the duration of each of the pulses of the pulse width modulation signal delivered by the generator MLI 37, and thus that of the pulses of the control signal. Such a generator MLI 37 is known per se, and provides a chopped signal at a high base frequency, for example in the order of 20 kHz. For each pulse, the duty cycle, of which the value is between 0% and 100% determines the duration of the application of this pulse.

The correction signal S5 makes it possible to modify the duty cycle of the pulse width modulation signal delivered by the generator MLI 37.

To achieve this, the output of the integrator circuit 34 delivering this correction signal S5 is connected to the input of an adder circuit 36 which receives, moreover, a reference value of the duty cycle delivered by a circuit 35. This reference value is, for example, a voltage signal of a value predetermined and stored during manufacture in the factory. Preferably, the circuit 35 is associated with means for adjusting this value, permitting the user to carry out an initial adjustment of this reference value of the duty cycle, for example in the form of a circuit (not shown) making it possible to add to the voltage signal delivered by the circuit 35, a variable voltage correction signal able to be adjusted by the user. This reference value of the duty cycle is predetermined so that after adding to the average value of the correction signal S5 obtained when the moving armature 9 arrives exactly in the set-point position Niv_Max, the value of the duty cycle provided at the input of the generator MLI 37 makes it possible to obtain a control signal corresponding at least substantially to the driving of the moving element 7, 9 in the driving direction as far as an extreme position estimated approximately according to the application and the mode of operation envisaged for the actuator.

The output of the adder circuit 36 is connected to the input of the generator MLI 37, such that the adder circuit 36 provides a value of the duty cycle to the generator MLI 37, said generator producing a pulse width modulation signal, the duty cycle thereof depending on the value which is provided thereto by the adder circuit 36. The output of the generator MLI 37 delivering the pulse width modulation signal is connected to an input of the commutator circuit 28 which delivers to the control circuit 12, according to the state of the signal provided by the first comparator 22, either this pulse width modulation signal or a zero signal.

The method implemented in the servocontrol of an actuator according to the invention is as follows. If the moving armature 9 exceeds the set-point position Niv_Max (first situation shown in FIG. 3) the signal S2 is not zero, and the correction signal S5 is negative, and the adder circuit 36 provides to the generator MLI 37 a duty cycle value which is lower, such that the driving energy provided to the moving element 7, 9 in the following cycle is also lower. If, in contrast, the moving armature 9 does not reach the set-point position Niv_Max (second situation shown in FIG. 3) the signal S2 is zero and the correction signal S5 is positive. The adder circuit 36 thus provides to the generator MLI 37 a higher duty cycle value, such that the driving energy provided to the moving element 7, 9 in the following cycle is also greater.

The moving element 7, 9 is driven by the winding 11 solely during one part of the duration of each operating cycle, when the moving armature 9 is in an extreme position opposing the extreme limit position i.e. when the air gap 17 is at a maximum. This duration of the application of electromagnetic force to the moving armature 9 is determined by the reference signal Ref, which thus constitutes a first approximate adjustment of the driving energy provided to the moving element 7, 9 in each cycle.

It is noteworthy that in the preferred embodiment described above and shown in the figures, the control signal, and thus the driving by the winding 11 are applied on both sides of the extreme maximum air gap position, the duration of the application from one side to the other of this extreme position being defined by the same reference signal Ref. Thus, in a first time period, the winding 11 starts to apply an electromagnetic force to the moving armature 9 in the driving direction, whilst said moving armature is further displaced in a direction opposing the driving direction. In this first time period, the electromagnetic force provided by the winding 11 thus has the effect of slowing down the moving armature 9.

As a variant, in contrast, there is nothing to prevent the winding 11 from being supplied with current only when the moving armature 9 is moved in the driving direction, i.e. after having exceeded the extreme maximum air gap position. In a variant, nothing prevents two different reference signals from being provided, one determining the instant when the control signal (and thus the electromagnetic force delivered by the winding 11) starts to be applied, the other determining the instant when the control signal (and thus the electromagnetic force delivered by the winding 11) is interrupted. In this last variant, each of the durations of the application of the driving force on both sides of the extreme maximum air gap position may be adjusted independently of one another.

In an actuator according to the invention, the servocontrol adjusts automatically the duty cycle of the control signal of the winding 11 according to the correction signal S5, which makes it possible to carry out an accurate adjustment of the energy imparted to the moving element 7, 9. Moreover, the multiplier coefficients Kpm, Kpp, and Ki of which the values may be adjusted during manufacture, or even by the user if the corresponding amplifying circuits 30, 31 and 33 are of variable and adjustable gain, make it possible to adjust the dynamic characteristics of the correction applied to the control signal in the subsequent cycle.

The coefficient Kpm makes it possible to adjust the contribution of the duration of the exceeding of the second position reference Niv_Max in the correction signal S5. This coefficient Kpm thus makes it possible to adjust the sensitivity of the correction, in the sense of reducing the energy to be produced.

The coefficient Kpp makes it possible to adjust the contribution in the correction signal S5 of the time period during which the moving element 9 is located between the first position reference Niv_Min and the second position reference Niv_Max. This coefficient Kpp thus makes it possible to adjust the sensitivity of the correction, in the sense of an increase in the energy to be provided.

The coefficient Ki makes it possible to adjust the overall value of the correction signal S5 relative to the duty cycle reference provided by the circuit 35. This coefficient Ki thus makes it possible to adjust the overall sensitivity of the servocontrol.

In an actuator according to the invention, the control signal delivered by the control circuit 12 interrupts the driving device (winding 11) before the moving element 7, 9 arrives in the end of travel position in the driving direction. It has been observed in practice, in spite of the relatively complex character of the behavior of such an actuator with variable reluctance, of which the moving armature 9 is in a state able to be described as ballistic when it is not subjected to the electromagnetic force of the winding 11, a particularly efficient, accurate, reliable and high-performance servocontrol may thus be obtained, with the position reference signals Ref, Niv_Min, Niv_Max and the constant multiplier coefficients Kpm, Kpp and Ki.

Tests have shown that the actuator according to the invention has a very high degree of operating stability, both with a pneumatic pump and with a hydraulic pump, with sudden pressure variations and is able to be subjected to variations in supply voltage, typically of 50 V to 100 V (which makes it possible to reduce the volume of capacitors and power converters). If required, the amplitude of the supply voltage of the winding 11 may also be adjustable by the user.

It is true in a large range of operating frequencies and in particular for relatively high frequencies, that the results obtained demonstrate that the operating frequency may reach at least 1000 Hertz for a displacement path of several millimeters and with a very small minimum air gap, in particular in the order of 0.05 mm. Excellent test results have been able to be obtained, in particular for frequencies of between 0 and 300 Hz.

FIG. 4 shows an example of results obtained with an actuator in accordance with the embodiment of FIG. 1. The average path of the piston 7 was in the order of 0.5 mm, the minimum air gap was in the order of 0.11 mm and the maximum air gap in the order of 0.7 mm. The chopping frequency of the supply voltage of the winding 11 was 20 kHz. On this figure, the curve 39 represents the position signal of the moving armature 9 provided by the sensor 21, the curve 40 represents the strength of current in the winding 11 and the curve 41 represents the variations of the correction signal S5. As is seen, therefore, only in FIG. 3, the operation of the actuator is controlled with a high degree of precision.

The precision of such a servocontrol according to the invention makes it possible, in particular, to reduce considerably the minimum air gap during operation.

In practice, it has been demonstrated that this minimum air gap may be in the order of 0.05 mm for an operating frequency of 300 Hz. Such a minimum air gap value has the effect of reducing the electrical consumption and also makes it possible to reduce the volume of the actuator, and to increase considerably the volumetric power provided, which constitutes a significant advantage in on-board applications, in particular in vehicles or space systems.

An actuator according to the invention is compact, having excellent performance, low mass and a high degree of reliability. It may be advantageously used in all on-board applications, whether static or dynamic.

In FIG. 3 has been shown an example in which the minimum air gap is non-zero and in which the displacement of the moving element 7, 9 in the driving direction as far as the position reference Niv_Max is not limited by an end stop. Thus, the position reference Niv_Max is at a distance from the wall 38 of the fixed armature 10 defining, with the moving armature 9, the air gap 17.

As a variant, it is possible to define the second position reference Niv_Max beyond the wall 38 of the fixed armature 10 located opposite the moving armature 9 defining the air gap 17 therewith. In this case, the moving armature 9 comes into contact with the fixed armature 10 which produces energy impacts controlled at high speed. Such impacts may also be obtained by the contact of one end of the piston 7 on an end stop integral with the fixed rack 20. Resilient means may be interposed between the two parts which come into contact in order to dampen the impacts, if required. In any case, the servocontrol of the actuator according to the invention also permits the energy produced during these impacts to be controlled with a high degree of precision, and with the same advantages as those indicated above in the case of operation at a minimum non-zero air gap.

It is noteworthy that the assembly of the servocontrol circuit shown in FIG. 2 may be implemented by similar components. To this end, the different operational circuits mentioned above may be implemented in a manner known per se, by similar components, in particular based on amplifiers or operational amplifiers.

It goes without saying that the invention may form the subject of numerous other applications and variants relative to the embodiment shown in the figures and described above. In particular, the invention also relates to an actuator having a plurality of moving elements, whether driven simultaneously or not, by the same driving device or not, or in reciprocating translation motion and/or in reciprocating rotational motion (the rotor of an electric motor, for example). Although particularly advantageous with a driving device of the electromagnetic type with variable reluctance, the invention however also relates to other types of driving device, for example driving devices using a solenoid, or a hydraulic motor or pneumatic motor or thermal motor or even an actuator comprising a plurality of combined driving devices. Moreover, the driving device may be bidirectional and may be used as return means in the direction opposing the driving direction to the extreme limit position. Moreover, in this variant, the servocontrol may be used to control the displacement of the moving element not only in a single driving direction but in both displacement directions, in a similar manner, a correction signal being created each time the moving element arrives in the vicinity of one of its extreme displacement positions.

The invention claimed is:

1. A reciprocating actuator comprising:
    a rack,
    at least one moving element guided relative to the rack so as to be able to be displaced with reciprocating motion relative to said rack,
    a device for driving the moving element in at least one direction, known as the driving direction,
    means of returning the moving element in a direction opposing the driving direction,
    at least one sensor for detecting the position of the moving element relative to the rack, capable of delivering a position signal representative of at least the position of said moving element in the vicinity of its extreme end of displacement position in the driving direction,
    a servocontrol adapted to adjust and deliver, for each displacement cycle of the moving element in the driving direction, a control signal of the driving device, the value thereof being determined for each cycle according to the difference between an extreme position adopted previously by the moving element in the driving direction as determined by the position signal and a predetermined extreme limit position of the moving element in its displacement in the driving direction,
    wherein the servocontrol:
    comprises at least one measuring chain designed to deliver for each displacement cycle of the moving element in the driving direction, at least one signal, known as the correction signal (S5), representative of the difference between the energy imparted on the moving element by the driving device during at least one cycle preceding that in which the control signal is applied, and the energy, known as nominal energy, to be imparted on this moving element to displace it exactly to its extreme set-point position,
    is designed to adjust for each cycle the control signal according to said correction signal (S5),
    and is designed to deliver a control signal, said control signal interrupting the driving device before the moving element arrives in the end of travel position in the driving direction.

2. The actuator as claimed in claim 1, wherein the correction signal (S5) is representative of at least the difference between the energy imparted to the moving element by the driving device during the displacement cycle immediately preceding that in which the control signal is applied, and the nominal energy.

3. The actuator as claimed in claim 1, wherein the correction signal (S5) is representative solely of the difference between the energy imparted on the moving element by the driving device during the displacement cycle immediately preceding that in which the control signal is applied, and the nominal energy.

4. The actuator as claimed in claim 1, wherein the correction signal (S5) is representative of a difference between a first value which is proportional to a time period during which the moving element exceeds, in the driving direction, a first position reference (Niv_Min) without exceeding a second position reference (Niv_Max) located downstream of the first position reference (Niv_Min) in the driving direction, and a second value which is proportional to a time period during which the moving element exceeds, in the driving direction, said second position reference (Niv_Max).

5. The actuator as claimed in claim 4, wherein the second position reference (Niv_Max) corresponds to the extreme limit position.

6. The actuator as claimed in claim 4, wherein the servocontrol comprises adjustment means making it possible to adjust the value of the first position reference (Niv_Min).

7. The actuator as claimed in claim 4, wherein the servocontrol comprises adjustment means making it possible to adjust the value of the second position reference (Niv_Max).

8. The actuator as claimed in claim 7, wherein said adjustment means make it possible to adjust the second position reference (Niv_Max) beyond the possible displacement amplitude of the moving element in the driving direction, such that said moving element abuts against a bearing surface of the rack.

9. The actuator as claimed in claim 1, wherein the servocontrol is adapted at each cycle to only authorize the application of the control signal of the driving device when the moving armature is at a greater distance from the fixed armature than a predetermined position, known as the principal position reference (Ref), of the moving armature.

10. The actuator as claimed in claim 9, wherein the servocontrol is adapted at each cycle to limit the total duration of application of the control signal to a duration which is less than the time period during which the moving armature is located beyond said principal position reference (Ref).

11. The actuator as claimed in claim 9, wherein the servocontrol comprises adjustment means making it possible to adjust the value of said principal position reference (Ref).

12. The actuator as claimed in claim 1, wherein, as the driving device is of the type providing increasing driving energy with the duration of the application of an electric control signal, the servocontrol is designed to adjust the control signal, from the correction signal, by pulse width modulation of this control signal.

13. The actuator as claimed in claim 12, wherein the servocontrol comprises means making it possible to adjust the total duration of the application of the control signal independently of the correction signal (S5).

14. The actuator as claimed in claim 1, wherein the servocontrol is implemented by an electronic circuit formed by exclusively similar components.

15. The actuator as claimed in claim 1, wherein it comprises at least one moving element guided in reciprocating translation motion relative to the rack.

16. The actuator as claimed in claim 1, wherein it comprises at least one moving element guided in reciprocating rotational motion relative to the rack.

17. The actuator as claimed in claim 1, wherein the driving device is of the electromagnetic type with variable reluctance.

18. The actuator as claimed in claim 1, wherein it is an electromagnetic linear actuator with variable reluctance comprising a fixed armature integral with the rack.

19. The actuator as claimed in claim 1, wherein said return means comprise resilient mechanical return means returning the moving element into a resting position remote from its extreme end of displacement position in the driving direction.

20. The actuator as claimed in claim 1, wherein it is adapted so that the moving element has a displacement path of between 0.1 mm and 10 mm and may be driven at a frequency of between 0 and 1000 Hertz.

* * * * *

UNITED STATES PATENT AND TRADEMARK OFFICE
Certificate

Patent No. 8,179,080 B2                                                                                            Patented: May 15, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jean-Claude Vannier, Malakoff (FR); Amir Arzande, Les Ulis (FR); Gerard Jeanblanc, Sevres (FR); Isabelle Gibek, L'Union (FR); Denis Schwander, Labarthe sur Leze (FR); François Roux, Gauré (FR); and François Dugué, Pompertuzat (FR).

Signed and Sealed this Twelfth Day of August 2014.

*EDUARDO COLON SANTANA*
*Supervisory Patent Examiner*
Art Unit 2837
Technology Center 2800